United States Patent
Al-Wazzan et al.

(10) Patent No.: US 10,443,906 B2
(45) Date of Patent: Oct. 15, 2019

(54) HEAT PUMP SYSTEM

(71) Applicant: Andor Technology Limited, Belfast (GB)

(72) Inventors: Raied Al-Wazzan, Lisburn (GB); Donal Denvir, Belfast (GB)

(73) Assignee: Andor Technology Limited, Belfast (GB)

( * ) Notice: Subject to any disclaimer, the term of this patent is extended or adjusted under 35 U.S.C. 154(b) by 398 days.

(21) Appl. No.: 15/009,218

(22) Filed: Jan. 28, 2016

(65) Prior Publication Data

US 2017/0115040 A1  Apr. 27, 2017

(30) Foreign Application Priority Data

Oct. 21, 2015 (GB) .................................. 1518691.9

(51) Int. Cl.
*F25B 21/02* (2006.01)
*F28D 15/02* (2006.01)
(Continued)

(52) U.S. Cl.
CPC .............. *F25B 21/02* (2013.01); *F25D 19/00* (2013.01); *F28D 15/02* (2013.01); *H04N 5/2252* (2013.01);
(Continued)

(58) Field of Classification Search
CPC .............. F25B 21/02; F25B 2321/0252; F25B 2321/023; H04N 5/2252; F28D 15/02; F25D 19/00
(Continued)

(56) References Cited

U.S. PATENT DOCUMENTS 2,755,361 A * 7/1956 Hertan ............... H01H 35/2614
337/324
2,780,757 A * 2/1957 Thornhill .............. H01L 23/473
257/708
(Continued)

FOREIGN PATENT DOCUMENTS

GB  1177844  1/1970
GB  2543549 A * 4/2017 .............. F25B 21/02
(Continued)

OTHER PUBLICATIONS

European Search Report dated Feb. 22, 2017 for corresponding United Kingdom Application Serial No. 16194924.3-1602, consisting of 5-pages.
(Continued)

*Primary Examiner* — Cassey D Bauer
*Assistant Examiner* — Kirsten U Oswald
(74) *Attorney, Agent, or Firm* — Christopher & Weisberg, P.A.

(57) ABSTRACT

A support assembly for a heat pump system comprising a base and a plurality of platforms for supporting a respective heat pump such as a thermoelectric cooler. Resiliently flexible pipes support the platforms with respect to the base and form part of a coolant circulation system. The platforms are movable with respect to each other and the support structures allow the platforms to move with respect to the base. An object to be cooled, such as an image sensor, is mounted on the heat pumps. The platforms are able to move in response to expansion and contraction of the object thereby preventing damage to the heat pump system.

33 Claims, 7 Drawing Sheets

(51) Int. Cl.
  *H04N 5/225* (2006.01)
  *F25D 19/00* (2006.01)
(52) U.S. Cl.
  CPC . *F25B 2321/023* (2013.01); *F25B 2321/0252* (2013.01)
(58) Field of Classification Search
  USPC ............... 62/3.2, 3.3; 165/67, 80.2, 80.4
  See application file for complete search history.

(56) References Cited

U.S. PATENT DOCUMENTS

| | | | | | |
|---|---|---|---|---|---|
| 2,997,514 | A * | 8/1961 | Roeder, Jr. | ............ | F25B 21/02 136/204 |
| 3,082,276 | A * | 3/1963 | Corry | ............ | H01L 35/00 136/205 |
| 3,208,877 | A * | 9/1965 | Merry | ............ | H01L 35/06 136/221 |
| 3,221,508 | A * | 12/1965 | Roes | ............ | H01L 35/30 136/204 |
| 3,225,549 | A * | 12/1965 | Elfving | ............ | F25B 21/04 62/3.3 |
| 3,240,261 | A * | 3/1966 | Morales | ............ | F25B 21/02 165/254 |
| 3,252,504 | A * | 5/1966 | Newton | ............ | F24F 3/06 165/208 |
| 3,255,593 | A * | 6/1966 | Newton | ............ | F24F 5/0042 62/3.3 |
| 3,269,875 | A * | 8/1966 | White | ............ | H01L 35/08 136/212 |
| 3,289,749 | A * | 12/1966 | Crump | ............ | A61B 18/02 165/48.1 |
| 3,510,362 | A * | 5/1970 | Charland | ............ | H01L 35/06 136/202 |
| 3,607,444 | A * | 9/1971 | DeBucs | ............ | F25B 21/02 136/208 |
| 3,703,668 | A * | 11/1972 | Bylund | ............ | H01L 23/473 257/714 |
| 3,804,676 | A * | 4/1974 | Sell, Jr. | ............ | H01L 35/06 136/205 |
| 3,819,418 | A * | 6/1974 | Winkler | ............ | H01L 35/30 136/205 |
| 3,895,313 | A * | 7/1975 | Seitz | ............ | H01S 3/034 372/103 |
| 3,955,122 | A * | 5/1976 | Maynard | ............ | H01L 23/467 361/710 |
| 4,038,831 | A * | 8/1977 | Gaudel | ............ | F25B 21/02 62/3.2 |
| 4,051,890 | A * | 10/1977 | Melchior | ............ | F24S 10/00 165/276 |
| 4,138,692 | A * | 2/1979 | Meeker | ............ | H01L 23/4332 165/80.4 |
| 4,203,129 | A * | 5/1980 | Oktay | ............ | H01L 23/42 165/104.14 |
| 4,254,431 | A * | 3/1981 | Babuka | ............ | H01L 23/3733 165/185 |
| 4,274,476 | A * | 6/1981 | Garrett | ............ | F28D 15/06 165/272 |
| 4,279,292 | A * | 7/1981 | Swiatosz | ............ | F24F 5/0042 165/61 |
| 4,313,492 | A * | 2/1982 | Andros | ............ | F28D 15/04 165/104.26 |
| 4,318,722 | A * | 3/1982 | Altman | ............ | A61M 19/00 62/3.62 |
| 4,395,728 | A * | 7/1983 | Li | ............ | H01L 23/427 165/104.26 |
| 4,420,940 | A * | 12/1983 | Buffet | ............ | H01L 35/30 136/209 |
| 4,448,240 | A * | 5/1984 | Sharon | ............ | H01L 23/4338 165/185 |
| 4,499,329 | A * | 2/1985 | Benicourt | ............ | H01L 35/30 136/208 |
| 4,561,011 | A * | 12/1985 | Kohara | ............ | H01L 23/367 174/16.3 |
| 4,561,040 | A * | 12/1985 | Eastman | ............ | F28F 9/0278 165/80.4 |
| 4,644,385 | A * | 2/1987 | Nakanishi | ............ | H01L 23/4332 165/80.4 |
| 4,729,060 | A * | 3/1988 | Yamamoto | ............ | H01L 23/4332 165/80.4 |
| 4,740,866 | A * | 4/1988 | Kajiwara | ............ | H01L 23/4332 165/80.4 |
| 4,750,086 | A * | 6/1988 | Mittal | ............ | H01L 23/4332 165/908 |
| 4,759,403 | A * | 7/1988 | Flint | ............ | H01L 23/4332 165/80.4 |
| 4,783,721 | A * | 11/1988 | Yamamoto | ............ | G02F 1/0036 257/714 |
| 4,848,090 | A * | 7/1989 | Peters | ............ | F25B 21/02 62/3.3 |
| 4,870,477 | A * | 9/1989 | Nakanishi | ............ | H01L 23/433 257/713 |
| 4,910,642 | A * | 3/1990 | Downing | ............ | H01L 23/4332 165/908 |
| 4,920,574 | A * | 4/1990 | Yamamoto | ............ | H01L 23/4332 165/80.4 |
| 4,928,207 | A * | 5/1990 | Chrysler | ............ | H01L 23/427 257/E23.088 |
| 4,939,621 | A * | 7/1990 | Galian | ............ | F27B 17/02 165/61 |
| 4,951,740 | A * | 8/1990 | Peterson | ............ | F28D 15/046 165/104.26 |
| 4,958,257 | A * | 9/1990 | Wenke | ............ | F28F 13/00 165/104.33 |
| 4,991,399 | A * | 2/1991 | Bourcier | ............ | F25B 21/02 62/3.2 |
| 4,996,589 | A * | 2/1991 | Kajiwara | ............ | H01L 23/433 257/714 |
| 5,022,462 | A * | 6/1991 | Flint | ............ | H01L 23/4338 165/185 |
| 5,031,689 | A * | 7/1991 | Jones | ............ | F25B 21/02 136/204 |
| 5,050,036 | A * | 9/1991 | Oudick | ............ | H01L 23/473 165/80.4 |
| 5,084,671 | A * | 1/1992 | Miyata | ............ | G01R 31/2875 165/80.4 |
| 5,092,129 | A * | 3/1992 | Bayes | ............ | B64G 6/00 62/259.3 |
| 5,154,661 | A * | 10/1992 | Higgins | ............ | F25B 21/02 62/3.2 |
| 5,166,863 | A * | 11/1992 | Shmunis | ............ | H01L 23/4332 165/80.4 |
| 5,195,020 | A * | 3/1993 | Suzuki | ............ | H01L 23/4332 257/714 |
| 5,198,889 | A * | 3/1993 | Hisano | ............ | F28D 15/0266 257/678 |
| 5,206,791 | A * | 4/1993 | Novotny | ............ | H01L 23/427 165/185 |
| 5,294,830 | A * | 3/1994 | Young | ............ | H01L 23/4338 165/80.4 |
| 5,324,597 | A * | 6/1994 | Leadbetter | ............ | H01M 10/6563 429/120 |
| 5,362,983 | A * | 11/1994 | Yamamura | ............ | H01L 35/32 136/203 |
| 5,365,400 | A * | 11/1994 | Ashiwake | ............ | H01L 23/433 165/80.4 |
| 5,465,192 | A * | 11/1995 | Yoshikawa | ............ | H01L 23/433 165/80.4 |
| 5,465,581 | A * | 11/1995 | Haertl | ............ | F04B 15/08 210/198.2 |
| 5,500,556 | A * | 3/1996 | Kosugi | ............ | H01L 23/433 257/718 |
| 5,535,818 | A * | 7/1996 | Fujisaki | ............ | F28F 27/00 165/104.25 |
| 5,735,339 | A * | 4/1998 | Davenport | ............ | C23C 14/541 165/80.1 |
| 5,847,366 | A * | 12/1998 | Grunfeld | ............ | G01K 1/143 219/497 |

(56) References Cited

U.S. PATENT DOCUMENTS

| | | | | |
|---|---|---|---|---|
| 5,992,172 A * | 11/1999 | Morita | F25B 21/02 62/307 |
| 6,105,662 A * | 8/2000 | Suzuki | F28D 15/0241 165/104.33 |
| 6,226,994 B1 * | 5/2001 | Yamada | F25B 21/02 136/203 |
| 6,279,354 B1 * | 8/2001 | Paek | C03B 37/02718 65/510 |
| 6,370,881 B1 * | 4/2002 | Maydanich | A61B 6/00 250/370.14 |
| 6,502,405 B1 * | 1/2003 | Van Winkle | F01P 9/06 62/239 |
| 6,543,246 B2 * | 4/2003 | Wayburn | G06F 1/20 257/E23.088 |
| 7,100,389 B1 * | 9/2006 | Wayburn | F25D 19/006 324/750.08 |
| 7,164,466 B2 * | 1/2007 | Hazelton | H01L 21/67109 355/72 |
| 7,243,704 B2 * | 7/2007 | Tustaniwskyi | G01R 31/2891 165/185 |
| 7,385,821 B1 * | 6/2008 | Feierbach | H01L 23/4332 165/104.33 |
| 7,679,917 B2 * | 3/2010 | Deck | H01L 23/4006 165/185 |
| 7,995,344 B2 * | 8/2011 | Dando, III | H05K 7/20445 361/710 |
| 8,176,972 B2 * | 5/2012 | Mok | F28D 15/02 165/104.26 |
| 8,309,475 B2 * | 11/2012 | Koelmel | C23C 16/4586 257/E21.328 |
| 9,230,882 B2 * | 1/2016 | Sunaga | H01L 23/4006 |
| 9,500,701 B2 * | 11/2016 | Tustaniwskyj | G01R 31/2874 |
| 9,743,558 B2 * | 8/2017 | Bosak | H05K 7/20336 |
| 2001/0055102 A1 * | 12/2001 | Emoto | G03F 7/70525 355/53 |
| 2003/0035088 A1 * | 2/2003 | Emoto | G03F 7/707 355/53 |
| 2004/0052052 A1 * | 3/2004 | Rivera | H01L 23/427 361/700 |
| 2004/0244384 A1 * | 12/2004 | Yamazaki | H01L 21/67109 62/3.2 |
| 2005/0217829 A1 * | 10/2005 | Belits | F28D 15/0266 165/104.33 |
| 2005/0241799 A1 * | 11/2005 | Malone | G06F 1/20 165/80.1 |
| 2007/0084623 A1 * | 4/2007 | Yamaguchi | H01B 12/16 174/125.1 |
| 2007/0227701 A1 * | 10/2007 | Bhatti | F28D 15/0275 165/104.21 |
| 2007/0257766 A1 * | 11/2007 | Richards | B82Y 10/00 337/298 |
| 2007/0283709 A1 * | 12/2007 | Luse | F25B 21/02 62/259.2 |
| 2007/0289313 A1 * | 12/2007 | Bhatti | F25B 21/02 62/3.2 |
| 2008/0053640 A1 * | 3/2008 | Mok | F28D 15/02 165/104.33 |
| 2009/0072385 A1 * | 3/2009 | Alley | H01L 23/38 257/713 |
| 2013/0072034 A1 * | 3/2013 | Yashima | H01L 21/263 438/795 |
| 2014/0090816 A1 * | 4/2014 | Yang | H01L 23/427 165/104.26 |
| 2014/0133101 A1 * | 5/2014 | Sunaga | G06F 1/20 361/699 |
| 2014/0261607 A1 | 9/2014 | Zhang et al. | |
| 2015/0000307 A1 | 1/2015 | Roll et al. | |
| 2015/0000308 A1 | 1/2015 | Roll et al. | |

FOREIGN PATENT DOCUMENTS

| | | |
|---|---|---|
| JP | 08321636 A | 12/1996 |
| JP | 11101525 A | 4/1999 |
| JP | H11108489 A | 4/1999 |

OTHER PUBLICATIONS

United Kingdom Search Report dated Mar. 31, 2016 for corresponding United Kingdom Application Serial No. GB1518691.9, consisting of 2 pages.

* cited by examiner

HEAT PUMP SYSTEM

CROSS-REFERENCE TO RELATED APPLICATION

This application claims priority to United Kingdom Patent Application Serial No.: 1518691.9, filed Oct. 21, 2015, entitled HEAT PUMP SYSTEM, the entirety of which is incorporated herein by reference.

STATEMENT REGARDING FEDERALLY SPONSORED RESEARCH OR DEVELOPMENT n/a

TECHNICAL FIELD

This invention relates to heat pumps. The invention relates particularly to thermoelectric heat pumps, especially thermoelectric coolers.

BACKGROUND

A problem with heat pumps, especially solid state heat pumps, is that thermal expansion and contraction during use can damage the material from which the pump is made. This problem is typically exacerbated with scale thereby limiting the size of the heat pump and therefore its usefulness.

For example, a thermoelectric cooler (TEC) may comprise stacked layers of semiconductor or equivalent heat pumping elements in between thin ceramic plates. The ceramic material has a propensity for internal thermal expansion that can cause fracturing of the ceramic, which dictates a maximum size of the area of the ceramic layer that should be used for the manufacture of TECs. For multilayer TECs this is typically in the region of 45 mm×45 mm.

The limit on the ceramic layer size restricts the number of semiconductor pillars that can be fitted in an array between layers and ultimately limits the maximum heat pumping capacity of the TEC device. In applications where the heat pumping capacity of a single TEC device is not sufficient, a heat pumping structure comprising multiple TEC devices can be used. However, thermal expansion and contraction of the device being cooled can damage the heat pumping structure.

For example, in the case where the device being cooled is an image sensor, multiple TEC devices may be used in parallel to remove heat from the image sensor. However, as the image sensor is cooled it shrinks as a result of thermal contraction and this can cause a mechanical fracture in the heat pumping structure, resulting in degradation or total failure in cooling performance.

Addressing these problems is complicated for applications where the device to be cooled needs to operate in a vacuum since the use of gases and lubricants is to be avoided.

It would be desirable to provide a heat pump system that mitigates the problems outlined above.

SUMMARY

A first aspect of the invention provides a support assembly for a heat pump system, the support assembly comprising: a plurality of platforms for supporting at least one respective heat pump; and at least one respective support structure for supporting a respective one of said platforms, wherein at least one of said platforms is movable with respect to at least one other of said platforms.

The support assembly typically includes a base, wherein at least one of said at least one respective support structure supports the respective platform with respect to said base. Optionally, said at least one respective support structure supports the respective platform with respect to said base. Preferably, said at least one respective support structure is configured to allow the respective platform to move with respect to said base.

Optionally, at least one of said at least one respective support structure supports the respective platform with respect to at least one other of said platforms.

Preferably, said a least one respective support structure is resiliently flexible to allow the respective platform to move.

Said platforms may be located side-by-side to form a composite platform. The composite platform may have a substantially planar obverse face comprised of the respective obverse faces of said platforms.

Each platform is contiguous with or spaced from the, or each adjacent platform in a rest state.

In preferred embodiments said at least one respective support structure holds said respective platform spaced apart from a base in a first direction, and is configured to allow movement of the respective platform in at least one other direction that is perpendicular to said first direction.

Typically, said at least one respective support structure holds said respective platform spaced apart from a base in a first direction, and is configured to allow movement of the respective platform in at least one direction that is substantially parallel with said first direction.

In typical embodiments, said platforms are not connected to one another although in alternative embodiments one or more platform may be connected to one or more adjacent platform, preferably in a manner that allows relative movement.

In preferred embodiments, said at least one respective support structure has a first end and a second end, and a body between the first and second ends, the body preferably being resiliently flexible. The first end may be coupled to the base and the second end may coupled to the respective platform. Alternatively, the first end may be connected to the respective platform and said second end is connected to another of said platforms.

The body may be shaped to define at least one curvilinear portion between the first and second ends. For example the body may be shaped to define one or more loops between its first and second ends. Alternatively, the body may comprises a bellowed portion between the first and second ends, or may be rectilinear.

In preferred embodiments, said at least one respective support structure comprises a pipe.

Typically, at least two of said respective support structures are provided for each platform.

In preferred embodiments, the support assembly incorporates a heat sink system. The heat sink system may comprise a coolant circulation system by which coolant received in use from a coolant source is returned to a coolant sink via said platforms, preferably through said platforms. In such cases, the at least one respective support structure may comprise a pipe, optionally a pair of concentric pipes, and forms part of said coolant circulation system in respect of the respective platform.

Optionally, each platform includes at least one respective coolant distribution channel, said at least one respective support structure being connected to said coolant distribution channel for the delivery of said coolant to, and return of said coolant from, said at least one coolant delivery channel. Said at least one respective support structure may comprise at least one support structure for delivering said coolant to said at least one coolant distribution channel of the respective platform and at least one support structure for returning said coolant from said at least one coolant distribution channel.

Typically, said heat sink system includes a coolant delivery manifold and a coolant return manifold connected to said coolant circulation system such that said coolant is received, in use, from said coolant source by said coolant delivery manifold, circulated by said circulation system and returned to said coolant sink by said return manifold. Conveniently, at least one of and preferably both of said coolant delivery manifold and a coolant return manifold are provided on or in said base.

Typically, said at least one support structure for delivering said coolant to said at least one coolant distribution channel of the respective platform is connected to said delivery manifold, and at least one support structure from returning said coolant from said at least one coolant distribution channel is connected to said return manifold.

In preferred embodiments, each platform carries at least one respective heat pump. Typically, each of said at least one respective heat pump is coupled to a common object to be cooled. The common object may comprise a single item, e.g. a single image sensor, or an assembly of items, e.g. a mosaic of image sensors.

Typically said common object comprises an electronic component, for example an image sensor, microprocessor or other integrated circuit, or a mechanical component, for example a container or an assembly of two or more such components.

In preferred embodiments, each platform carries a single respective heat pump.

Preferably, said heat pump comprises a thermoelectric heat pump, especially a thermoelectric cooler. Typically said thermoelectric cooler has a hot side and a cool side, said hot side being thermally coupled to the obverse face of the respective platform. The respective cool side of each thermoelectric cooler is typically thermally coupled to an object to be cooled.

A second aspect of the invention provides a heat pump system comprising a support assembly according to the first aspect of the invention, wherein each platform carries at least one respective heat pump, preferably a single respective heat pump.

In typical embodiments, the heat pump system includes a vacuum housing, said support assembly and heat pumps being located within said housing and held under vacuum.

A third aspect of the invention provides an image sensor assembly comprising the heat pump system of the second aspect of the invention, wherein, preferably, the respective cool side of each thermoelectric cooler is thermally coupled to an image sensor.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
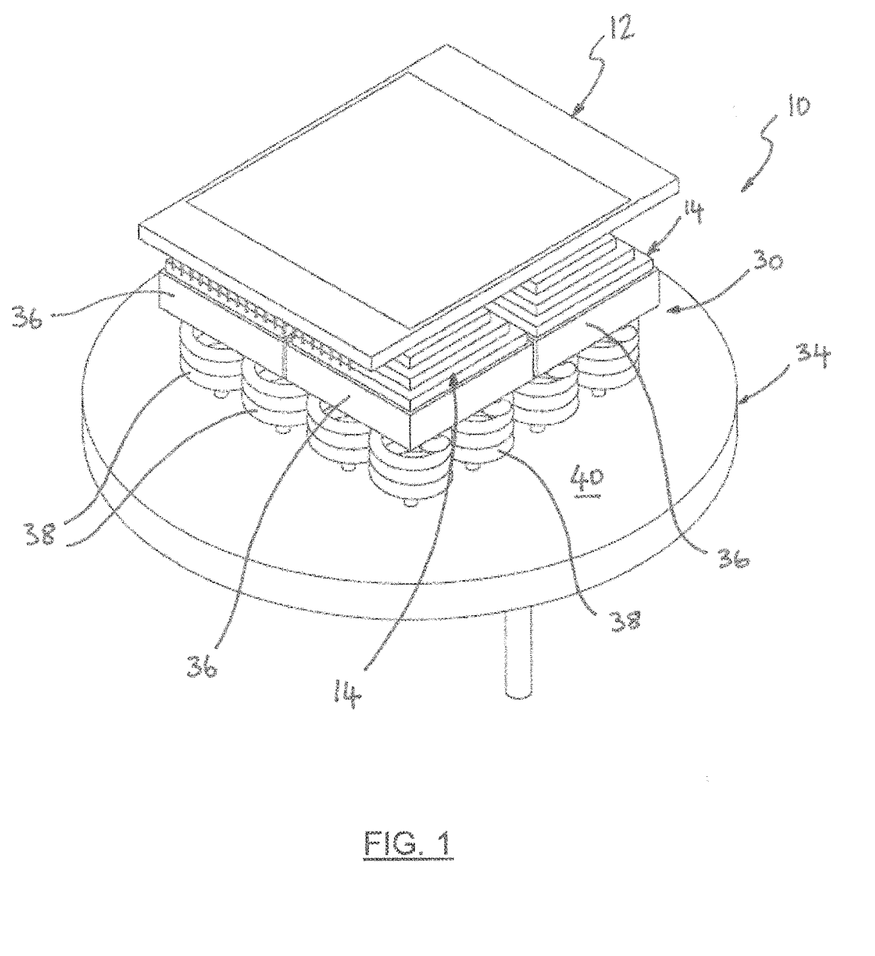
FIG. 1 is an isometric view of a heat pump system embodying the invention, the system being shown in assembly with an image sensor.
Figure 2:
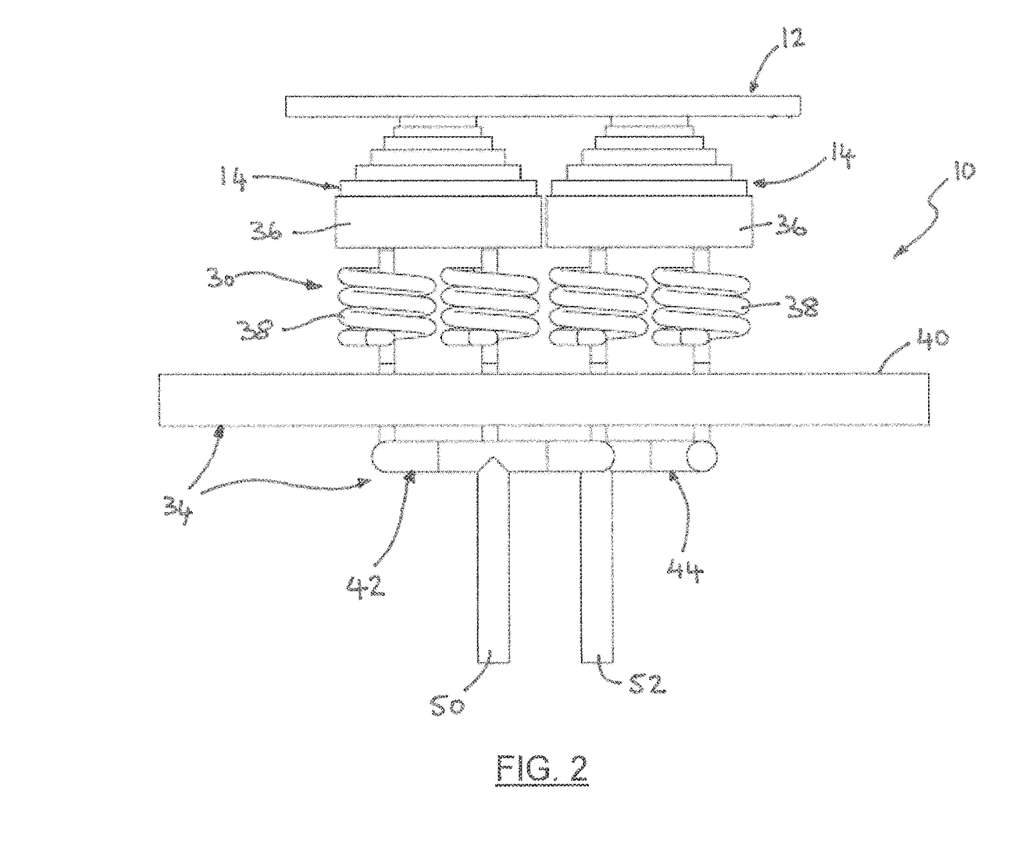
FIG. 2 is a side view of the heat pump system and image sensor assembly of FIG. 1.

Referring now to FIGS. 1 and 2 of the drawings there is shown, generally indicated as 10, a heat pump system embodying one aspect of the invention. The heat pump system 10 is shown in assembly with an image sensor 12. In use the heat pump system cools the image sensor 12 by drawing heat away from the underside of the sensor 12.

The image sensor 12 may be of any conventional type. For example, the image sensor 12 may be a charge-coupled device (CCD) image sensor (including interline CCD sensors and electron multiplying CCD sensors, an active pixel sensor, a CMOS image sensor, a sCMOS (scientific CMOS) sensor, infrared imaging sensor or other electronic image sensor. The image sensor 12 is typically part of an imaging device such as a camera or microscope (not shown). It will be understood that the invention is not limited to use with image sensors and may be used with any other object that requires cooling, especially refrigeration below ambient temperature, or otherwise cooling by a relatively large amount, e.g. an amount that calls for active cooling rather than passive cooling. For example, heat pump systems and/or support assemblies embodying the invention may be used with structures such as containers, e.g. for samples or specimens, mechanical or electronic components or devices, e.g. a biochip, microprocessor or other integrated circuit. Advantageously, a single structure, or object, is supported by a support assembly having a plurality of platforms that can move with respect to each other, as is described on more detail hereinafter. The single structure/object may comprise a single item, e.g. one image sensor, or may comprise an assembly of multiple items, e.g. multiple image sensors, connected together (typically rigidly or substantially rigidly).

The heat pump system 10 comprises a plurality of heat pumps 14. In preferred embodiments, the heat pumps 14 are solid state heat pumps, typically thermoelectric heat pumps. Thermoelectric heat pumps are also known as thermoelectric modules (TEMs) or, in applications where they perform a cooling function, as thermoelectric coolers (TECs). In the illustrated embodiment, the heat pumps 14 are TECs (which are also known as Peltier coolers). In alternative embodiments (not illustrated), the heat pumps 14 could be other solid state heat pumps.

Figure 7A:
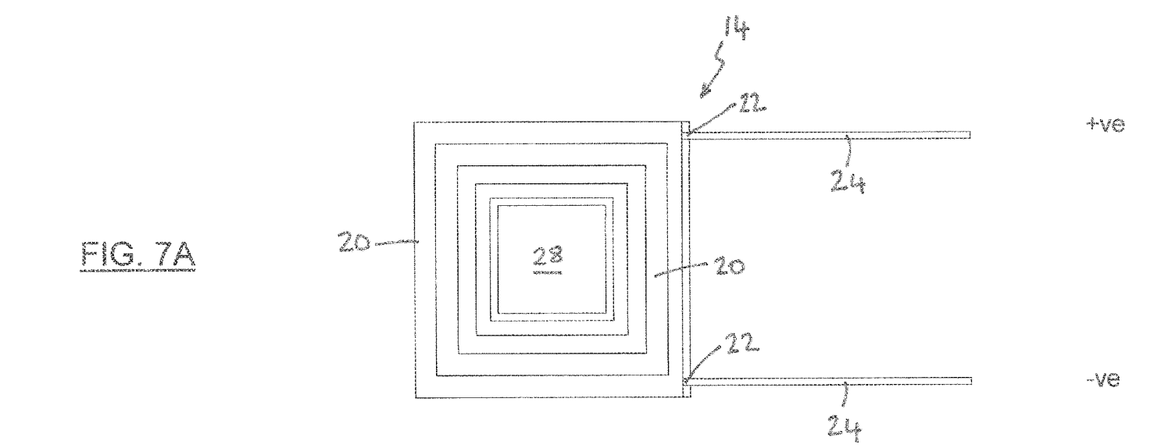
FIG. 7A is a plan view of a thermoelectric cooler suitable for use with embodiments of the invention.
Figure 7B:
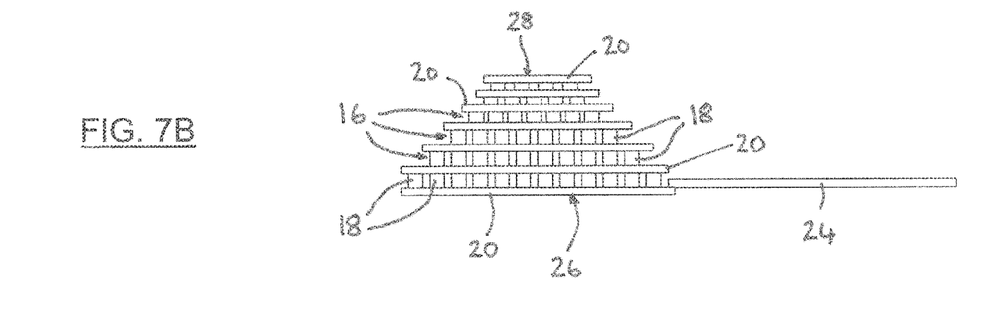
FIG. 7B is a side view of the thermoelectric cooler.

FIGS. 7A and 7B show an exemplary embodiment of the TEC 14 as used in the illustrated embodiment of the system 10. The TEC 14 comprises stacked layers 16 of heat pumping elements 18, each layer being provided between plates 20. Typically, each heat pumping element 18 is comprised of a p-type semiconductor material (e.g. a p-doped semiconductor telluride pellet) or an n-type semiconductor material (e.g. an n-doped semiconductor telluride pellet). The heat pumping elements 18 of each layer are configured to be thermally in parallel to each other and electrically in series. Each layer is electrically connected to the adjacent layer(s). Electrical terminals 22 are provided for supplying electrical power to the heat pumping elements, typically via electrical leads 24. The plates 20 are formed from a thermally conducting and electrically insulating material, typically a ceramic material. Opposite faces 26, 28 of the TEC 14 are designated as the "hot side" 26 and the "cool side" 28. When DC current flows through the TEC 14, the action of the heat pumping elements 18 brings heat from the cool side 28 to the hot side, so that cool side gets cooler while the hot side gets hotter. It will be understood that the TECs 14 may take any other suitable form, e.g. any other conventional TEC, and need not necessarily have more than one layer of heat pumping elements. The TEC 14 shown in FIGS. 7A and 7B have 6 layers by way of example only; more generally the TEC 14 may have one or more layers.

Referring again to FIGS. 1 and 2, the cool sides 28 of the TECs 14 are thermally coupled to the image sensor 12, typically to its reverse face. The image sensor 12 may be mounted on, and typically fixed to, the TECs 14 by any convenient means, which may include a thermally conductive layer (not shown) comprising, for example, pad(s), adhesive and/or solder. Typically, the image sensor 12 includes connector pins (not shown) which may be connected to corresponding connector pins (not shown) provided on a base 34 by any convenient connectors (not shown) e.g. wires or ribbon cable, to connect the image sensor 12 to an electronic system (not shown).

The hot side 26 of each TEC 14 is thermally coupled to a heat sink system 30. Each TEC 14 may be mounted on, and typically fixed to, a respective surface of the heat sink system 30 by any convenient means, e.g. by a thermally conductive layer (not shown) comprising, for example, pad(s), adhesive and/or solder. In use, the TECs 14 transfer heat from the image sensor 12 to the heat sink system 30 thereby cooling the image sensor 12. The heat sink system 30 disposes of the heat transferred from the image sensor 12 as is describe d in more detail below.

Figure 3:
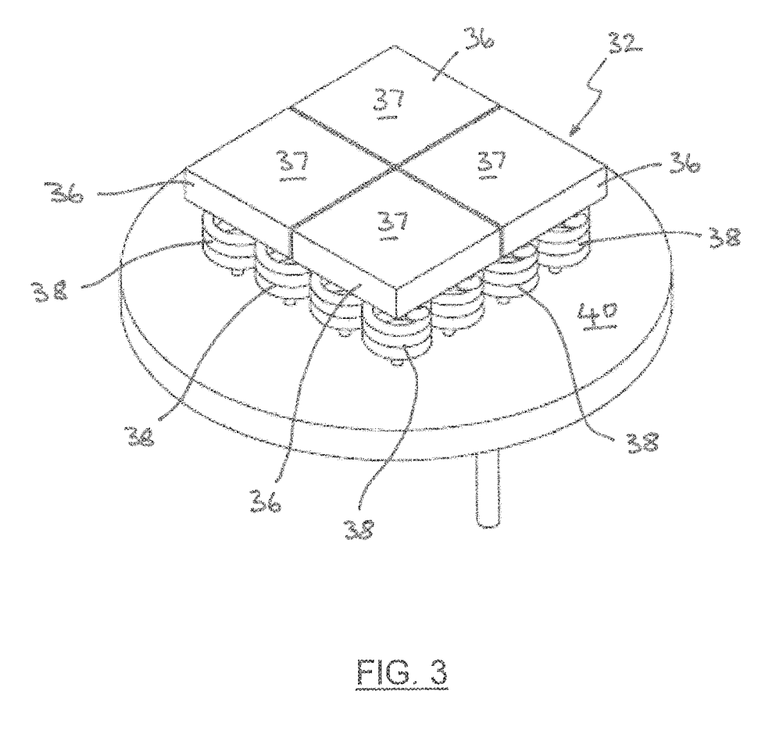
FIG. 3 is an isometric view of a support assembly embodying a second aspect of the invention, the support assembly being part of the heat pump system of FIG. 1.

The heat sink system 30 is incorporated into a support assembly 32 for the TECs 14. The support assembly 32 comprises the base 34 and a plurality of platforms 36. Each platform 36 is connected to the base 34 by one or more respective support structures 38. Typically, the platforms 36 are located side-by-side, at least when in a rest state, typically in a two dimensional array, and are preferably substantially co-planar with one another. The platforms 36 together form a composite platform for supporting the TECs 14. Adjacent platforms 36 may be contiguous with one another, at least in the rest state, although they may alternatively be spaced apart. The preferred arrangement is that the respective obverse faces 37 of the platforms 36 are substantially coplanar with one another, thereby providing the composite platform with a substantially level surface on which the TECs 14 are mounted. Typically each platform 36 is substantially cuboid in shape, or at least substantially rectangular, e.g. substantially square, in longitudinal cross section, which facilitates their arrangement as a composite platform. In alternative embodiments, the platforms may take any other regular or irregular shape.

In the illustrated embodiment, there are four platforms 36 arranged in a 2×2 array. In alternative embodiments there may be more than or fewer than four platforms as suits the application. Typically, a respective platform 36 is provided for each TEC 14, i.e. one TEC 14 per platform. Alternatively, more than one TEC 14 may be mounted on the same platform 36, i.e. more than one TEC 14 per platform.

The base 34 is shown as comprising a plate, but may take any other convenient form comprising one or more structures with respect to which the platforms are supported. Typically, the base 34 has an obverse face 40 that is disposed substantially parallely with the composite platform, usually substantially parallel with the obverse faces 37 of the platforms 36.

In preferred embodiments therefore, the platforms 36 are supported on the base 34 by the support structures 38, the support structures 38 holding the platforms 36 spaced apart from the base 34 in a longitudinal direction, i.e. a direction perpendicular to the obverse face 40 of the base in preferred embodiments.

The platforms 36 are capable of moving with respect to each other (and therefore also with respect to the base 34), at least in one or more lateral directions (being perpendicular to the longitudinal direction), i.e. directions that are substantially parallel with the obverse face 40 of the base 34 in preferred embodiments. To this end, the platforms 36 are preferably not connected to each other. Alternatively, the platforms 36 may be coupled to one another by any coupling means, e.g. one or more flexible connectors or joints, that allows relative movement between the platforms 36. In any event, it is preferred that the platforms are freely movable with respect to each other. It will be understood that the characteristics of the composite platform described above in relation to the rest state may not apply when one or more of the platforms has moved with respect to the others.

In alternative embodiments (not illustrated) the platforms, or at least some of them, may be located adjacent the base and be supported with respect to the base by one or more support structures. In preferred embodiments, including the illustrated embodiment, each platform is supported by the base by one or more respective support structure. Alternatively, one or more of the platforms may be supported by the base by one or more respective support structure, the other platform(s) being supported by one or more of the base-supported platforms or by each other so long as at least one of the other platform(s) is supported by one or more of the base-supported platforms. In such embodiments, the base-supported platform(s) may be connected directly to the base by one or more of the support structures 38. Each other platform may be coupled to one or more of the other platforms, conveniently to one or more adjacent platform, by a connector or other coupling, at least one and optionally all of which allow relative movement between the respective platforms. Therefore the inter-platform coupling preferably comprises a flexible resilient connector, e.g. the support structure 38 described herein. Alternatively, the connection between some of the platforms, and/or between one or more of the platforms and the base may be rigid. In any event, at least one platform is movable with respect to at least one other platform and with respect to the base, although typically there are multiple platforms movable with respect to each other and with respect to the base. The movement between platforms is typically in one or more lateral directions, e.g. towards and away from each other. In typical embodiments, the lateral directions are substantially parallel with the major plane of the image sensor or other object being supported. Alternatively or in addition, the platforms may move in the longitudinal direction, e.g. towards and away from the image sensor or other object being supported.

As is described in more detail below, the platforms 36 form part of the heat sink system 30. To this end it is preferred that the platforms 36 are formed from a thermally conductive material, typically metal, e.g. copper.

The support structures 38 may be rigid or semi-rigid and may be formed form any convenient material, e.g. metal, plastics or composite material. Typically the support structures 38 are sufficiently flexible and resilient to facilitate the movement of the platforms 36 described above. In addition, the support structure s 38 may be sufficiently flexible and resilient to allow movement of the respective platforms 36 towards and away from the base 34, i.e. in the longitudinal direction in the illustrated example.

In preferred embodiments, each platform 36 is supported by at least two respective support structures 38.

In typical embodiments, a respective platform 36 is provided for each TEC 14. In alternative embodiments, more than one TEC 14 may be mounted on any one or more of the platforms.

Figure 6:
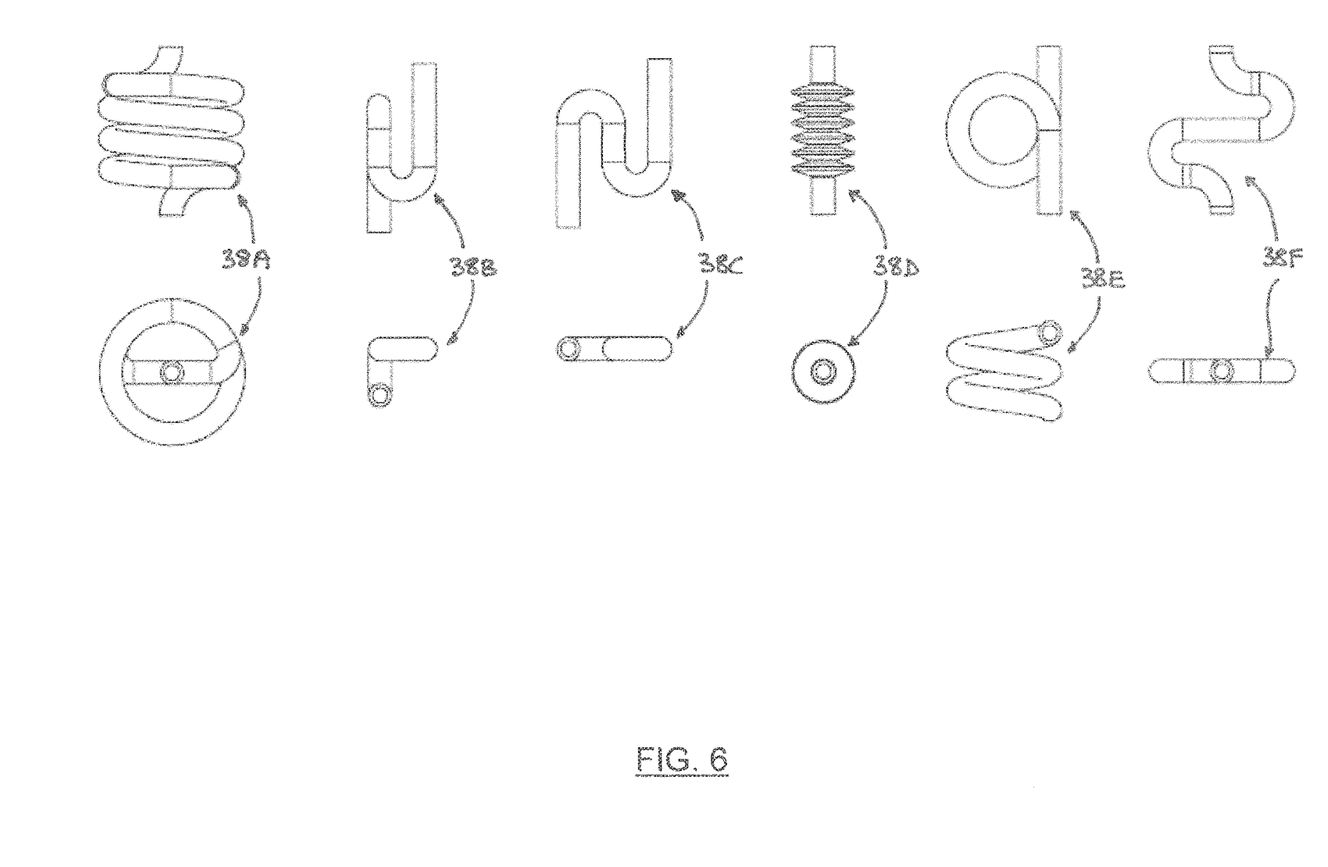
FIG. 6 shows a side view and an end view of respective alternative embodiments of a support structure being part of the support assembly of FIG. 3.

The preferred support structures 38 have a first end coupled to the base 34 and a second end coupled to the respective platform 36, and a body between the first and second ends. In preferred embodiments, the body of at least one and preferably all of the support structures 38 is rectilinear, or curvilinear or a combination of the two, and/or includes a portion that facilitates bending. FIG. 6 illustrates examples of suitable support structures 38A to 38F respectively, any one or more of which may be used in support assemblies or heat pump systems embodying the invention. Typically, all of the support structures 38 of a given support assembly are of the same type although they may be different. Although the body may be rectilinear (not illustrated) between the first and second ends. it is preferred that the body of the support structure 38 is shaped to define at least one curvilinear portion between the first and second ends. It is further preferred that the support structure 38 is shaped to define one or more loops between its first and second ends. Hence, the or each curvilinear or looped portion is located between the base 34 and the platform 36. The, or each curvilinear portion, and in particular the or each loop, may be disposed substantially in a plane that is parallel with, oblique to or perpendicular to the obverse face of the composite platform. Support structure 38D illustrates a structure with a bellowed portion between the first and second ends.

Advantageously, the illustrated embodiments, and other similar configurations, improve the ability of the support structure to bend resiliently, which facilitates the desired movement of the platform 36. In preferred embodiments, the support structures 38 form part of the heat sink system 30 and to this end each support structure 38, in particular the body, comprises a pipe. In such embodiments, it is preferred that the pipes 38 are formed from a thermally conductive material, typically metal, e.g. copper.

Figure 4:
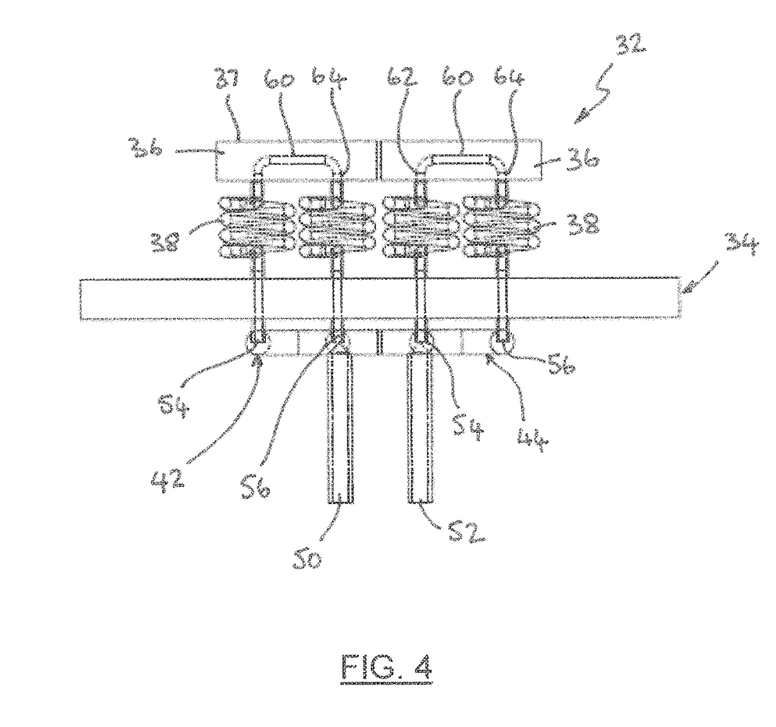
FIG. 4 is a side view of the support assembly of FIG. 3.
Figure 5:
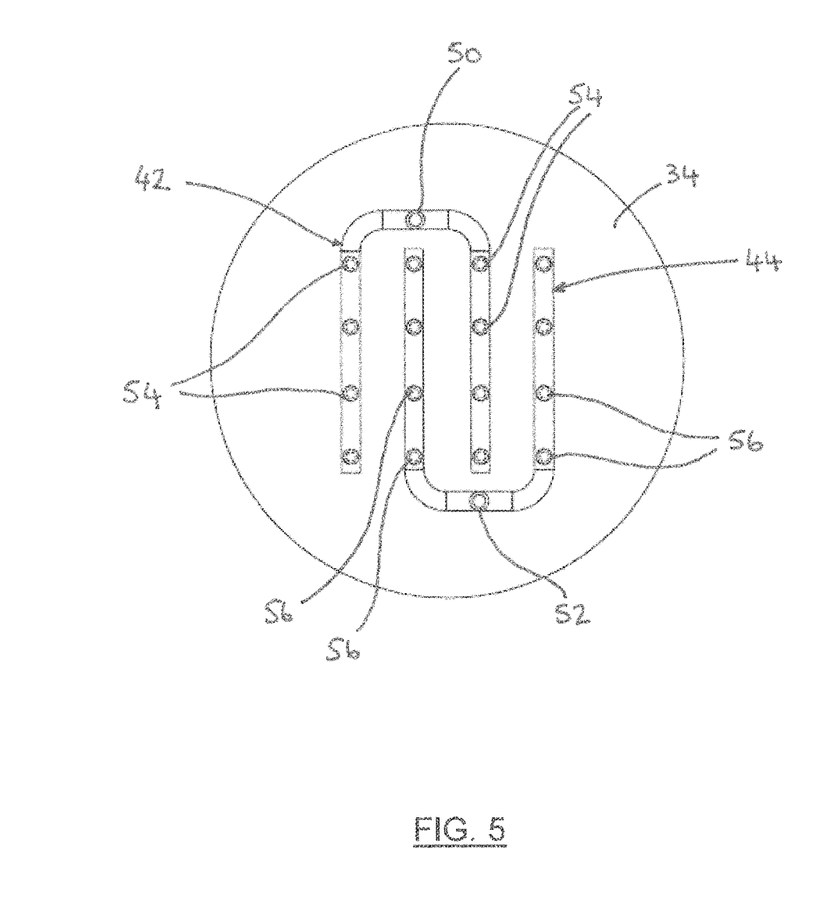
FIG. 5 is a plan view of the underside of support assembly of FIG. 3.

Referring in particular to FIGS. 4 and 5, the heat sink system 30 further includes a coolant delivery manifold 42 and a coolant return manifold 44. Each manifold 42, 44 may comprise one or more channels 46, 48 formed in the base 34 (e.g. in the illustrated base plate) or platforms 36 respectively, and/or may comprise one or more pipes forming the base 34 or part of the base 34 or platforms 36 respectively. In the illustrated embodiment, the delivery manifold 42 comprised pipes being part of the base 34 and being located beneath the base plate, while the return manifold 44 comprises channels formed in the platforms. The delivery manifold 42 has an inlet 50 for connection to a source (not shown) of coolant, which is typically water but may be any other suitable fluid as desired. The return manifold 44 has an outlet 52 for connection to a sink (not shown) for the coolant. The coolant source and sink form part of a coolant delivery and return system (not shown) which typically includes one or more pumps (not shown) and pipes (not shown) for delivering the coolant to the heat sink system 30 from the coolant source, and returning the coolant from the heat sink system to the coolant sink. In alternative embodiments, the coolant may be circulated by convection rather than by pumping. The coolant source and sink may be implemented as a common reservoir (not shown), i.e. such that the coolant is recirculated to and from the heat sink system 30.

The delivery manifold 42 has a respective outlet 54 for at least one support structure 38 for each platform 36, the first end of the respective support structure 38 being connected to the respective outlet 54 so that the coolant can flow from the manifold 42 into the support structure 38. The return manifold 44 has a respective inlet 56 for at least one other support structure 38 for each platform 36, the first end of a respective support structure 38 being connected to the respective inlet 56 so that the coolant can flow from the support structure 38 into the manifold 44. In preferred embodiment, for each platform 36 there is at least one support structure 38 for delivering coolant to the platform and at least one other support structure for returning the coolant from the platform 36. In the illustrated embodiment, there are two support structures 38 for delivering coolant to each platform and two other support structures for returning the coolant from the platform 36. In alternative embodiments there may be more than two support structures for delivering coolant to each platform and more than two other support structures for returning the coolant from the platform. Alternatively still, one or more support structures may be provided that both deliver coolant to and return coolant from the respective platform, such support structures being configured, e.g. internally divided, to provide at least one delivery channel and at least one return channel (not illustrated). For example, each platform may have a respective support structure comprised of concentric pipes, one of the outer and inner pipes carrying the coolant to the platform and the other returning it from the platform.

With reference in particular to FIG. 4, each platform 36 is provided with one or more coolant distribution channels 60 having at least one inlet 62 and at least one outlet 64. In particular, each distribution channel 60 has a respective inlet 62 for each support structure 38 that delivers coolant to the platform 36 and a respective outlet for each support structure 38 that returns coolant from the platform 36. In the illustrated embodiment each platform 36 has two channels 60 (only one visible), each having one inlet 62 and one outlet 64. More or fewer distribution channels 60 may be provided as desired. The, or each, channel 60 extends laterally across the platform 36. The channel(s) 60 may be rectilinear or curvilinear as desired. The configuration of the channel(s) 60, i.e. the location, shape and/or size of the channel(s) 60, is preferably arranged to extend across the length and breadth of the platform. The channel(s) may be formed in the platform 36, i.e. beneath the obverse face 37 (as illustrated in FIG. 4), or may be provided by one or more pipes (not illustrated) carried by the platform.

The second end of the, or each, respective support structure 38 for delivering coolant to the platform 36 is connected to a respective inlet 62 of the respective channel 60 so that the coolant can flow from the support structure 38 into the channel 60. The second end of the, or each, respective support structure 38 for returning coolant from the platform 36 is connected to a respective outlet 64 of the respective channel 60 so that the coolant can flow from channel 60 into the support structure 38.

Hence, the support structures 38 and channels 60 provide a coolant circulation system, being part of the heat sink system 30 together with the platforms 36, by which coolant received by the manifold 42 from the coolant source is circulated through the platform 36 and returned to the coolant sink via the manifold 44. The heat sink system 30 disposes of the heat transferred from the TECs 14 by conduction (e.g. from the platforms 36 and the support structures 38) and by the heat exchanging action of the coolant circulation system.

In alternative embodiments (not illustrated) the heat sink system is not a coolant (fluid) circulation system and may take other forms, e.g. comprising an air-cooled heat sink. In such embodiments, each, or at least some of the, support structures may comprise a heat pipe having one end connected to a respective platform and the other end connected to a heat sink. The heat sink may therefore in some embodiments provide the base.

During use, when the image sensor 12 (and/or other components of the system including the TECs 14 themselves) expands or contracts (which may or may not occur uniformly across the sensor 12) a resulting force is imparted to the TECs 14. Because the platforms 36 are able to move relative to one another, the TECs 14 can move relative to one another in response to the force exerted by the image sensor 12, thereby dissipating the force which may otherwise have damaged the TECs 14.

In typical embodiments, the hot side 26 of each TEC 14 is maintained at an ambient temperature by the heat sink system 30, while the cool side 28 is maintained below ambient temperature. For example image sensors tend to work best when cooled to below zero centigrade. In some applications it can be advantageous to deep cool to in the region of −90° C. to −100° C.

It will be apparent that in preferred embodiments, multiple TECs 14 are used with a mechanical support assembly that accommodates thermal expansion or contraction of the system components while still providing efficient removal of the relatively high heat load from the bottom layer of the TECs. In addition, the support assembly supports the image sensor in a manner that reduces the transmission of vibrations or other unwanted side-effects. Advantageously, thermal contraction of the various components is accommodated by individually mounting the bottom (hot side) of each TEC on a moveable platform while the top (cool side) of each TEC is rigidly fixed to the image sensor, thereby allowing in particular for contraction of the image sensor when it is cooled and the resulting inward movement of the TECs 14. The high heat load generated at the hot side of the TECs is efficiently removed by the use of liquid cooling in (e.g. copper) piping which also acts as a flexible join accommodating the thermal movements of the mechanical structure.

Embodiments of the invention are particularly, but not exclusively, suitable for use in applications where the object being cooled and the heat pump system are in vacuum (i.e. located within a housing and held under vacuum), where other techniques such as lubricated joints cannot be used.

It is found that embodiments of the invention can successfully deep cool image sensors with an active area of up to approximately 61.4 mm×61.4 mm, whereas previously similar deep cooling using self contained thermoelectric cooling techniques was achievable only with image sensors having an active area of up to 28 mm×28 mm.

Moreover, the self contained nature of the thermoelectric cooling avoids the need for cumbersome refrigeration systems or liquid nitrogen supplies. This reduces operating costs and allows deep cooled cameras to be used in remote locations without supervision.

While the invention has been described herein in the context of thermoelectric cooling, it will be understood that it is not limited to such. In alternative embodiment, the heat pump system may be configured to heat rather than cool an object.

The invention is not limited to the embodiment(s) described herein but can be amended or modified without departing from the scope of the present invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A support assembly for a heat pump system, the support assembly comprising:
   a plurality of platforms, each platform being configured to support at least one respective heat pump;
   a coolant circulation system for said platforms; and
   at least one respective support structure for supporting a respective one of said platforms,
   where said platforms are located laterally adjacent each other and disposed substantially in a common plane to form a composite platform
   and where said at least one respective support structure is configured to allow the respective platform to move with respect to at least one other of said platforms in at least one lateral direction that lies in said common plane,
   and where said a least one respective support structure is at least one pipe that is flexible to allow the respective platform to move in said at least one lateral direction with respect to at least one other of said platforms, said at least one pipe being part of said coolant circulation system.

2. The support assembly of claim 1, further including a base, where at least one of said at least one respective support structure supports the respective platform with respect to at least one of the group consisting of said base and where said at least one respective support structure supports the respective platform with respect to said base.

3. The support assembly of claim 2, wherein said at least one respective support structure is configured to allow the respective platform to move with respect to said base.

4. The support assembly of claim 1, wherein at least one of said at least one respective support structure supports the respective platform with respect to at least one other of said platforms.

5. The support assembly of claim 1, wherein said platforms are located side-by-side to form said composite platform.

6. The support assembly of claim 1, wherein each platform is contiguous with or spaced from an, or each, adjacent platform in a rest state.

7. The support assembly of claim 1, wherein said at least one respective support structure holds said respective platform spaced apart from a base in a first direction, and is configured to allow movement of the respective platform in at least one other direction that is perpendicular to said first direction.

8. The support assembly of claim 1, wherein said at least one respective support structure holds said respective platform spaced apart from a base in a first direction, and is configured to allow movement of the respective platform in at least one direction that is parallel to said first direction.

9. The support assembly of claim 1, wherein said platforms are rectangular in longitudinal cross section.

10. The support assembly of claim 1, wherein said platforms are not connected to one another.

11. The support assembly of claim 1, wherein said at least one respective support structure has a first end and a second end, and a body between the first and second ends.

12. The support assembly of claim 11, wherein said body is shaped to define at least one curvilinear portion between the first and second ends.

13. The support assembly of claim 12, wherein said at least one curvilinear portion is disposed in a plane that is perpendicular with an obverse face of the respective platform.

14. The support assembly of claim 12, wherein said body is shaped to define one or more loops between its first and second ends.

15. The support assembly of claim 11, wherein said body comprises a bellowed portion between the first and second ends.

16. The support assembly of claim 11, wherein said body is rectilinear.

17. The support assembly of claim 11, further comprising a base wherein said first end is coupled to the base and said second end is coupled to the respective platform.

18. The support assembly of claim 1, wherein at least two of said respective support structures are provided for each platform.

19. The support assembly of claim 1, further including a heat sink system comprising said coolant circulation system for circulating a coolant between a coolant source and said platforms.

20. The support assembly of claim 19, wherein each platform includes at least one respective coolant distribution channel, said at least one respective support structure being connected to said coolant distribution channel for the delivery of said coolant to, and return of said coolant from, said at least one coolant delivery channel.

21. The support assembly of claim 20, wherein said at least one respective support structure comprises at least one support structure for delivering said coolant to said at least one coolant distribution channel of the respective platform and at least one support structure for returning said coolant from said at least one coolant distribution channel, and where said heat sink system includes a coolant delivery manifold and a coolant return manifold connected to said coolant circulation system such that said coolant is received, in use, from said coolant source by said coolant delivery manifold, circulated by said circulation system and returned to said coolant source by said return manifold, and where at least one of said coolant delivery manifold and said coolant return manifold are provided on or in a base, and where said at least one support structure for delivering said coolant to said at least one coolant distribution channel of the respective platform is connected to said delivery manifold, and at least one support structure from returning said coolant from said at least one coolant distribution channel is connected to said return manifold.

22. The support assembly of claim 1, wherein each platform carries at least one respective heat pump.

23. The support assembly of claim 1, wherein said at least one support structure comprises a heat pipe.

24. The support assembly of claim 1, wherein each platform is movable with respect to at least one adjacent platform.

25. The support assembly of claim 1, wherein said at least one pipe comprises a pair of concentric pipes.

26. A support assembly for a heat pump system, the support assembly comprising:
a plurality of heat pumps;
a plurality of platforms, each platform carrying at least a respective one of said heat pumps; and
at least one respective support structure for supporting a respective one of said platforms,
where said platforms are located laterally adjacent each other and disposed substantially in a common plane to form a composite platform,
and where said at least one respective support structure is configured to allow the respective platform to move with respect to at least one other of said platforms in at least one lateral direction so that the respective at least one heat pump of the respective platform is movable with respect to the respective at least one heat pump of at least one other of said platforms in said at least one lateral direction.

27. The support assembly of claim 26, wherein each heat pump comprises a thermoelectric cooler having a hot side and a cool side, said hot side being thermally coupled to the obverse face of the respective platform.

28. The support assembly of claim 27, wherein said cool side of each heat pump is coupled to a common object to be cooled, and where said common object comprises an image sensor, a microprocessor or an integrated circuit.

29. The support assembly of claim 26, wherein said a least one respective support structure is at least one pipe that is flexible to allow the respective platform to move in said at least one lateral direction with respect to at least one other of said platforms.

30. The support assembly of claim 29, further including a coolant circulation system for said platforms, said at least one pipe being part of said coolant circulation system.

31. The support assembly of claim 26, further including a base, wherein at least one of said at least one respective support structure supports the respective platform with respect to at least one from the group consisting of said base and where said at least one respective support structure supports the respective platform with respect to said base.

32. The support assembly of claim 26, wherein at least one of said at least one respective support structure supports the respective platform with respect to at least one other of said platforms.

33. A support assembly for a heat pump system, the support assembly comprising:
a plurality of platforms, each platform being configured to carry at least one respective heat pump; and
where said platforms are located laterally adjacent each other and disposed substantially in a common plane to form a composite platform,
and where said at least one respective support structure supports the respective platform with respect to at least one other of said platforms and is configured to allow the respective platform to move with respect to said at least one other of said platforms in at least one lateral direction that lies in said common plane.

* * * * *